United States Patent
Liao et al.

(10) Patent No.: US 11,176,306 B2
(45) Date of Patent: Nov. 16, 2021

(54) METHODS AND SYSTEMS TO PERFORM AUTOMATED INTEGRATED FAN-OUT WAFER LEVEL PACKAGE ROUTING

(71) Applicant: Synopsys, Inc., Mountain View, CA (US)

(72) Inventors: About Liao, Hsinchu (TW); Bing Chen, Austin, TX (US); Happy Wang, Hsinchu (TW); Pagan Chou, Hsinchu (TW); Cheng-chieh Chen, Hsinchu (TW); Philippe Aubert McComber, San Jose, CA (US); Siarhei Lekhtsikau, Campbell, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/991,653

(22) Filed: Aug. 12, 2020

(65) Prior Publication Data

US 2021/0049315 A1 Feb. 18, 2021

Related U.S. Application Data (60) Provisional application No. 62/885,504, filed on Aug. 12, 2019.

(51) Int. Cl.
*G06F 30/394* (2020.01)
*G06F 30/398* (2020.01)

(52) U.S. Cl.
CPC .......... *G06F 30/394* (2020.01); *G06F 30/398* (2020.01)

(58) Field of Classification Search
CPC .. G06F 30/394; G06F 30/398; G06F 2113/18; H01L 24/19; H01L 24/20; H01L 23/49816; H01L 23/49838
See application file for complete search history.

(56) References Cited

U.S. PATENT DOCUMENTS

| | | | | |
|---|---|---|---|---|
| 6,829,757 B1 * | 12/2004 | Teig | .................. | G06F 30/394 716/112 |
| 6,877,146 B1 * | 4/2005 | Teig | .................. | G06F 30/394 716/129 |

(Continued)

OTHER PUBLICATIONS

Y. Ho, H. Lee and Y. Chang, "Escape Routing for Staggered-Pin-Array PCBs," in IEEE Transactions on Computer-Aided Design of Integrated Circuits and Systems, vol. 32, No. 9, pp. 1347-1356, Sep. 2013, doi: 10.1109/TCAD.2013.2259539. (Year: 2013).*

*Primary Examiner* — Stacy Whitmore
(74) *Attorney, Agent, or Firm* — Sterne, Kessler, Goldstein & Fox P.L.L.C.

(57) ABSTRACT

A method, a system, and non-transitory computer readable medium for level package routing are provided. The method includes performing triangulation on a set of nets to generate a routing resource graph. The objects of the set of nets are represented by a respective center point during triangulation. The method also includes generating a route between the objects of the set of nets based on at least a total cost. The total cost is determined based on at least the routing resource graph. The method also includes altering the route based on a determination that a constraint rule is unmet and outputting routing information comprising the route for the set of nets.

20 Claims, 10 Drawing Sheets

(56) References Cited

U.S. PATENT DOCUMENTS

| | | | | |
|---|---|---|---|---|
| 6,938,234 B1 * | 8/2005 | Teig | ...................... | G06F 30/394 |
| | | | | 716/129 |
| 7,117,468 B1 * | 10/2006 | Teig | ...................... | G06F 30/394 |
| | | | | 716/129 |
| 8,006,216 B1 * | 8/2011 | Chen | ...................... | G06F 30/394 |
| | | | | 716/126 |
| 2015/0067632 A1 * | 3/2015 | Chen | ...................... | G06F 30/398 |
| | | | | 716/129 |

* cited by examiner

METHODS AND SYSTEMS TO PERFORM AUTOMATED INTEGRATED FAN-OUT WAFER LEVEL PACKAGE ROUTING

CROSS-REFERENCE TO RELATED APPLICATIONS

The present application claims the benefit under 35 U.S.C. § 119(e) of U.S. Provisional Patent Application No. 62/885,504, filed on Aug. 12, 2019, which is incorporated herein by reference in its entirety for all purposes.

TECHNICAL FIELD

The present disclosure relates to automated integrated fan-out wafer level package routing.

BACKGROUND

An Integrated Fan-Out (InFO) wafer level package eliminates substrates from traditional electronic packages, enabling smaller size, lower power and higher interconnect density. It also helps integrate logic, memory and passive components in a compact format. InFO technology is gaining popularity in mobile and other mid-range to high-range applications.

The InFO package design cycle involves many steps including pin assignment, signal routing, power/ground routing, power/ground plane generation, teardrop creation, and the like. Routing is a major part of the design cycle. Due to complex design rules and increasing number of I/O pins used in the InFO package, existing package redistribution layer (RDL) router or printed circuit board (PCB) router do not have the capacity or capability to do fully automated routing. Significant manual intervention is required.

SUMMARY

In one aspect, a method includes performing triangulation on a set of nets to generate a routing resource graph. The objects of the set of nets are represented by a respective center point during triangulation. The method also includes generating a route between the objects of the set of nets based on at least a total cost. The total cost is determined based on at least the routing resource graph. The method also includes altering the route based on a determination that a constraint rule is unmet and outputting routing information comprising the route for the set of nets.

In one aspect, a system includes a memory storing instructions and a processor, coupled with the memory and to execute the instructions. The instructions when executed cause the processor to perform triangulation on a set of nets to generate a routing resource graph, generate a route between the objects of the set of nets based on at least a total cost, alter the route based on a determination that a constraint rule is unmet, and output routing information comprising the route for the set of nets. The objects of the set of nets are represented by a respective center point during triangulation. The total cost is determined based on at least the routing resource graph.

In one aspect, a non-transitory computer readable medium comprising stored instructions. The instruction when executed by a processor, cause the processor to perform triangulation on a set of nets to generate a routing resource graph, wherein objects of the set of nets are represented by a respective center point during triangulation; generate a route between the objects of the set of nets based on at least a total cost, wherein the total cost is determined based on at least the routing resource graph; alter the route based on a determination that a constraint rule is unmet; and output routing information comprising the route for the set of nets.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to methods and systems to perform automated integrated fan-out wafer level package routing.

Conventional Integrated Fan-Out (InFO) package routing can require multiple iterations due to an unexpected requirement change, netlist change or failure to pass all sign-off checking. Each iteration could require a long runtime, which increases with a number of I/O pins and routing layers available for the InFO technology.

Conventional package routing solutions are typically capable only of 45 or 90 degree automatic routing. Some package routers or printed circuit board (PCB) routers can resolve any angle routing interactively, but not in a batch mode. As the number of layers and number of pins increase in InFO package, it is vital to have an accurate routing resource estimation and proper layer assignments for each net in order to achieve a successful routing and to enable automatic any angle routing.

Approaches are described herein to automate routing for InFO wafer level packages. The described approaches to automate routing enable smaller size, lower power and higher interconnect density compared to conventional electronic packages, while improving design productivity. "Any angle" routing may be used to maximize utilization of routing resources (e.g., floorplan). The approaches described herein accurately model resource estimation needed for any angle path and support automatic any angle routing. Further, the approaches described herein provide a deterministic and general fixing solution to acute angle violations between intersecting paths in a systematic way.

An automated routing flow is described herein. The automated routing flow breaks down a complex InFO routing problem into multiple steps. Methods are described herein for accurate routing resource estimation for any angle paths, pin escape routing considering stacking via rules, crossing-cost/length-cost consideration in coarse routing, acute angle fixing during detail routing and power/ground routing considering disjoint power/ground planes.

A conventional routing resource planning (global planning) involves partitioning available routing areas into a set of disjoint global routing cells (gcell) and analyzing supply/demand at the boundaries of each gcell. A typical InFO design has a high pin count and the space between neighboring pins is small which can accommodate at most a few of minimum-width routing traces. If a partition creates too many gcells, the size of a gcell could be too small to accommodate even one package routing trace. The approaches described herein provide a method to avoid the over-fracturing of routing resources against pins or obstructions and preserve a big chunk of routing resource as one gcell. Hereafter a gcell may also be referred to as a routing channel.

In one embodiment, after global planning, a coarse routing that generates a route for 2-pin nets sequentially is performed. A crossing cost is introduced to make the coarse routing less sensitive to net routing order. The coarse routing also considers user defined constraints (e.g., length matching constraint). Output of coarse routing defines the exact topology of each 2-pin connections with respect to existing pins or obstructions (i.e., relative relation of a connection being either to the left or to the right of a pin or obstruction is determined after coarse routing).

In one embodiment, a detail router can straighten the coarse routing result without violating design rules. The detail router described herein provides a general solution to fix an acute angle between two intersecting routing paths, which may happen in package routing and requires significant manual efforts to fix them by adding patches.

In one embodiment, power/ground plane-aware and power/ground routing is performed. Power/ground routing optimizes the routing pattern to corresponding power/ground plane and connects disjoint planes of a same net.

Figure 1:
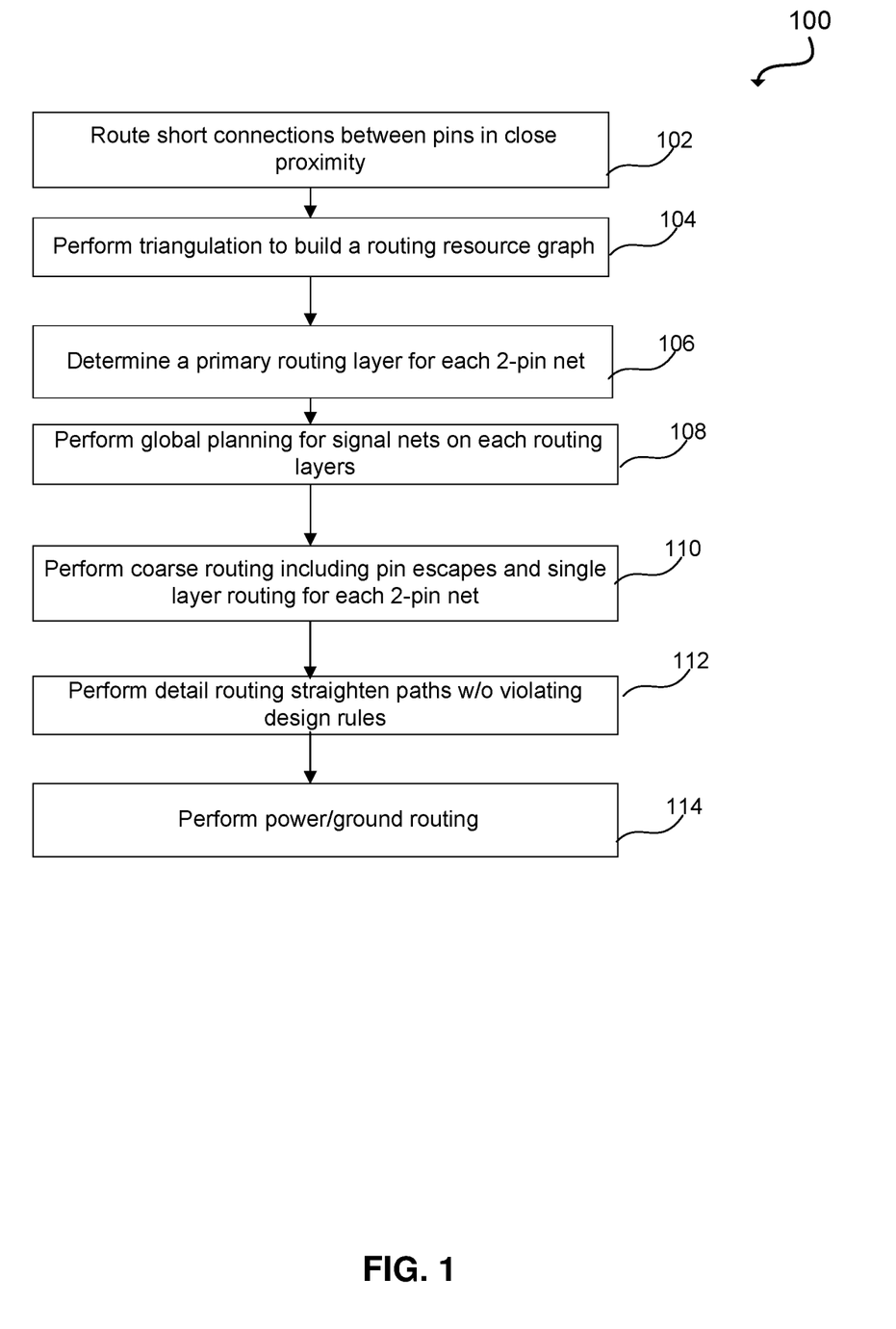
FIG. 1 depicts an Integrated Fan-Out (InFO) package routing flow, in accordance with an embodiment of the present disclosure.

FIG. 1 depicts an InFO package routing flow 100, in accordance with an embodiment of the present disclosure. The routing flow 100 outputs routing paths/vias connecting all nets and satisfying design rules and user constraints while minimizing overall wire length and via counts for an InFO design including a set of bumps, I/O pins and macro pins.

At step 102, a short route between pins in close proximity is generated. The short route is performed prior to routing resource modeling. In other words, short connection are connected prior to routing resource modeling. Two pins are considered in close proximity when the two pins are immediate neighbors on a same layer (i.e., no third pin exist between the two pins) and can be connected by a very short wire. The two pins are also considered in close proximity when the two pins are overlapping in x/y location (i.e., horizontal location or position in the layer) but reside on adjacent layers and can be connected through a via.

At step 104, triangulation (e.g., Delaunay triangulation) is performed against the set of bumps, pins, and/or vias to build a routing resource graph (i.e., routing search graph). Triangulation is a technique used in package routing to partition a routing area into disjoint routing regions each region being a triangle. Triangulation takes a set of points as input and outputs a set of triangles such that the union of triangles is equals to the routing area. The triangles do not overlap each other except at the border where two neighboring triangles share a common edge. The method described herein minimizes the number of triangles created from triangulation through modeling of circular or near circular pin/via objects, which simplifies the global planning at step 108.

At step 106, trial route is performed to determine primary routing layer for each 2-pin net. Package routing is predominantly single layer routing. Limited routing on other layers may be added to reach source pins or target pins residing on a different layer. The trial routing is performed on nets sequentially. The routing order of nets can be based on net criticality. For example, nets with shielding/matching/timing constraints have a higher criticality and may be routed before other nets. The output of trial route assigns a routing layer (i.e., the primary routing layer) for each 2-pin net.

At step 108, global planning for each signal net is performed independent of the routing order for each routing layer. Routing capacity and routing cost due to congestion for all edges of the routing search graph are determined as described further below. The method described herein accurately determines the routing capacity of all edges of the routing search graph for any angle paths routing, with or without the presence of existing preroutes.

At step 110, sequential coarse route is performed for each 2-pin net to identify all triangle edges the 2-pin net connection crosses. Pin escape routing that does short routing from pin layer to designate routing layer established in 106 is performed. The single layer coarse router can perform minimum-cost search based on the routing search graph established in 108. Coarse routing output has a deterministic topology with respect to existing pins/obstructions for each 2-pin net.

At step 112, detail route is performed to straighten each coarse routing connection without violating design rules. Exact coordinates of a crossing point are determined for each crossing edge minimizing wire length while satisfying design rules. The coarse routing result may have unnecessary bends. Detail route straightens/tightens the loose connections without violating the design rules.

At step 114, routing is performed for power/ground nets to connect a power/ground pin to closest power/ground plane or connect two disjoint power/ground planes. The approaches for power/ground routing described herein handle connections between disjoint power/ground planes which are not handled by a conventional package router as described further below.

In one embodiment, the route is altered based on a determination that a constraint rule is unmet (e.g., an acute angle) as described further below. Further, routing information that includes the route for the nets may be output.

It should be understood that some of the above steps of the flow diagram of FIG. 1 can be executed or performed in an order or sequence other than the order shown and described in the figure. Further, some of the above steps may be performed well in advance of other steps, or may be executed or performed substantially simultaneously or in parallel. For example, step 106 and step 108 may be performed simultaneously.

Figure 2A:
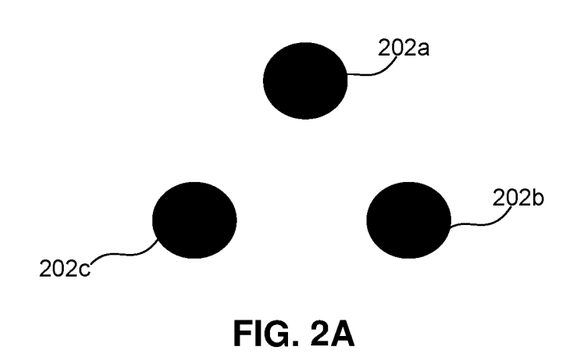
FIG. 2A depicts actual layout shapes, in accordance with an embodiment of the present disclosure.

FIG. 2A depicts actual layout shapes of bumps or pins in the InFO package design, in accordance with an embodiment of the present disclosure. In InFO package designs, bumps or pins are usually circular (e.g., 202a, 202b, 202c) or near circular (e.g., oblong). As inputs to triangulation usually takes a set of points, each layout polygon is converted into points before triangulation. Typically, vertices of polygons are selected to be the input of the triangulation. Traditionally circular bumps/pins are approximated with octagons. Performing a constrained Delaunay triangulation (CDT) against vertices of octagons fracture the free routing area into many small triangles as shown in FIG. 2B.

Figure 2B:
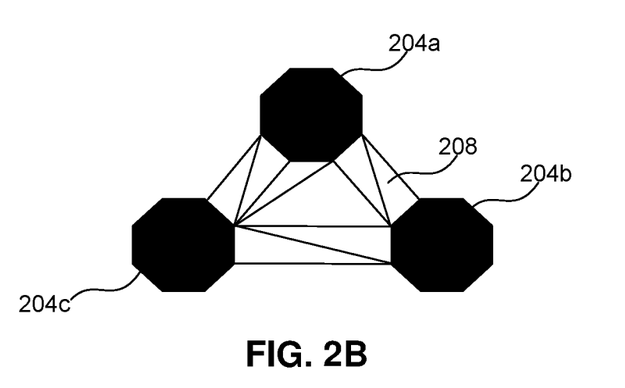
FIG. 2B depicts approximating circular shapes with octagons.

FIG. 2B depicts approximating circular shapes with octagons 204a, 204b, 204c. Performing CDT results in many small triangles between the three circular objects (e.g., 202a, 202b, 202c). Each triangle (e.g., 208) is a gcell. The small triangles make resource planning (step 108 of FIG. 1) more difficult and less effective as a small triangle may not be able to accommodate even one package routing trace. In typical InFO package design where pin count is high and package size is small, the space between two neighboring pins may accommodate a couple of minimum width traces at most.

Figure 2C:
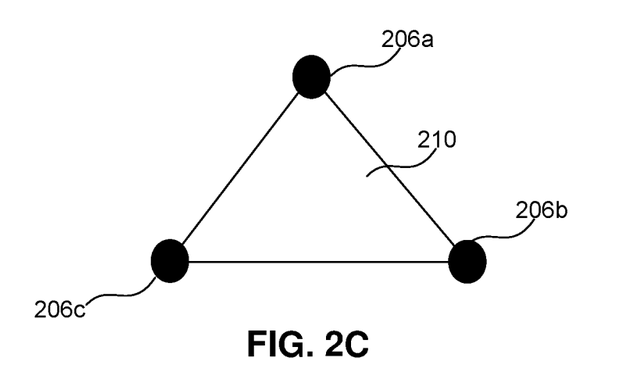
FIG. 2C depicts representing circular shapes using center points, in accordance with an embodiment of the present disclosure.

FIG. 2C depicts representing the circular shapes using center points in accordance with an embodiment of the present disclosure. The circular shapes 202a, 202b, 202c are represented using center points 206a, 206b, 206c of the circular shapes. CDT is performed against the center points. Performing CDT against the center points 206a, 206b, 206c results in a simpler triangulation. The triangle 210 is much larger than triangles in FIG. 2B (e.g., triangle 208). A larger triangle facilitates resource global planning (e.g., at step 108 of FIG. 1). In other words, the routing area between the three circular objects is preserved as one gcell.

The effect on routing resources due to the size of the circular shapes is considered when determining an edge capacity of the routing resource graph as discussed below.

One of the objectives of global planning (e.g., performed at step 108 of FIG. 1) is to establish a routing capacity value that can determine the number of traces that can cross a triangle edge simultaneously without causing shorts or spacing violations for all triangles created at step 104. Each triangle generated at step 104 represents a routing channel.

Figure 3:
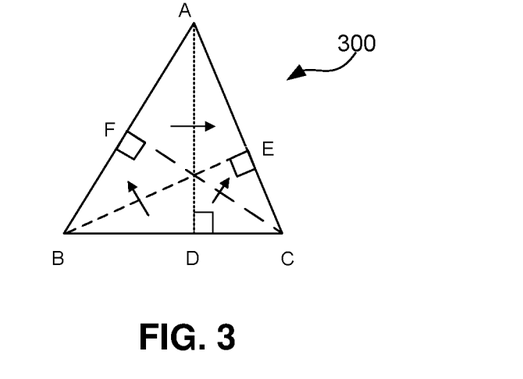
FIG. 3 depicts a routing channel, in accordance with an embodiment of the present disclosure.

FIG. 3 depicts a routing channel 300 in accordance with an embodiment of the present disclosure. AD, BE, CF are altitude lines for corresponding base edges of the routing channel 300, respectively. There are three possible ways to route through the triangle channel 300 based on the pair of crossing edges. For each pair of edges, a channel capacity is determined. The routing channel 300 is associated with three channel capacity numbers. For example, the channel capacity for pair AB and AC, pair BC and BA, and pair CA and CB is determined.

In one embodiment, the following relationship holds true when routing is perpendicular to the altitude lines when the obstructions (object A, B, C) has 0 dimension. Capacity of the pair AB and AC is equal to the length of AD. Capacity of the pair BC and BA is equal to the length of BE. Capacity of the pair CA and CB is equal to the length of CF.

Figure 4:
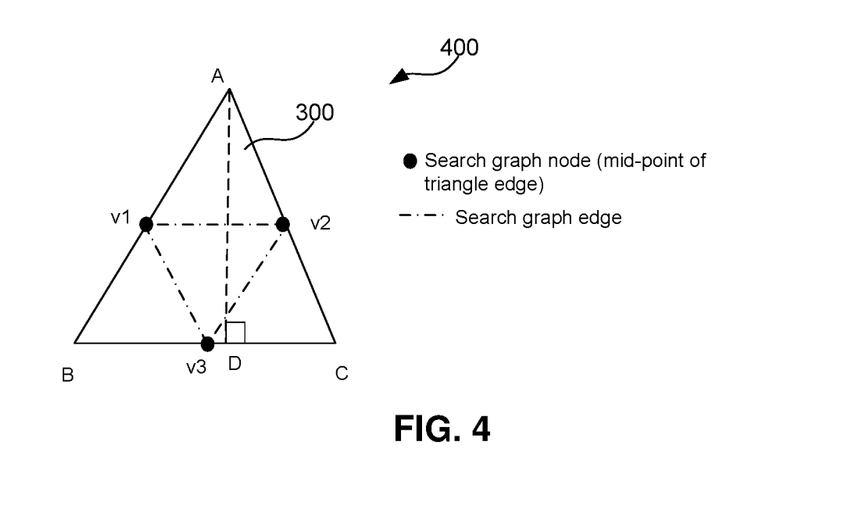
FIG. 4 depicts search graph nodes and edges, in accordance with an embodiment of the present disclosure.

FIG. 4 depicts search graph nodes and edges, in accordance with an embodiment of the present disclosure. Routing search graph nodes include the median points of each triangle generated from CDT (e.g., at step 104 of FIG. 1) and the source/target nodes generated by CDT (e.g., at step 104 of FIG. 1). For routing search graph 400, an edge (v1, v2) represents routes entering the routing channel 300 from edge AB and exiting the triangle from edge AC. An edge (v1, v3) represents routes entering the routing channel 300 from edge AB and exiting the routing channel 300 from edge BC. An edge (v2, v3) represents routes entering the routing channel 300 from edge AC and exiting the routing channel 300 from edge BC.

Figure 5:
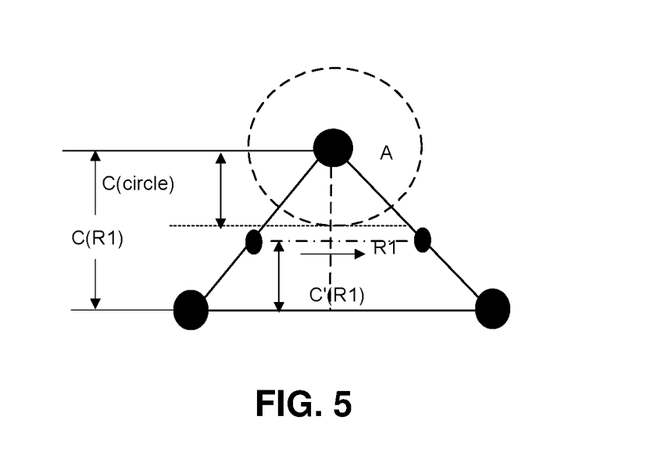
FIG. 5 depicts capacity adjustment considering size of an obstruction, in accordance with an embodiment of the present disclosure.

FIG. 5 depicts capacity adjustment considering size of obstruction, in accordance with an embodiment of the present disclosure. Routing channel capacity determination is also a function of an obstruction size. Obstruction A is a circular object and has a radius C. Let C (R1) be the capacity of routing R1 assuming A is a point. Let C' (R1) be the actual capacity of R1 considering A is a circle. Thus, C' (R1)=C (R1)–C (circle).

Figure 6:
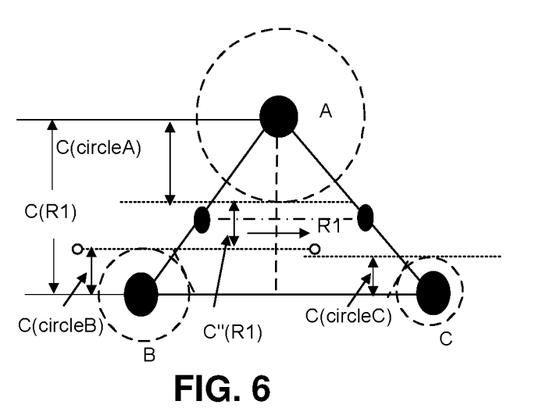
FIG. 6 depicts capacity adjustment considering size of obstructions, in accordance with an embodiment of the present disclosure.

FIG. 6 depicts capacity adjustment considering size of obstructions, in accordance with an embodiment of the present disclosure. In one embodiment, C (circle A), C (circle B) and C (circle C) represent the radius of circular obstruction shapes at vertex A, B, and C, respectively. The actual capacity of R1 considering the sizes of A, B, and C obstructions is C" (R1)=C (R1)–C (circle A)–max (C (circle B), C (circle C)), where C (R1) is the capacity of routing R1 when the A, B, and C obstructions are single points.

In one embodiment, the InFO design may include existing wires/vias (i.e., preroutes). A remaining channel capacity is determined given the existing preroutes in a triangle channel when the existing preroutes cannot be moved or modified.

Figure 7:
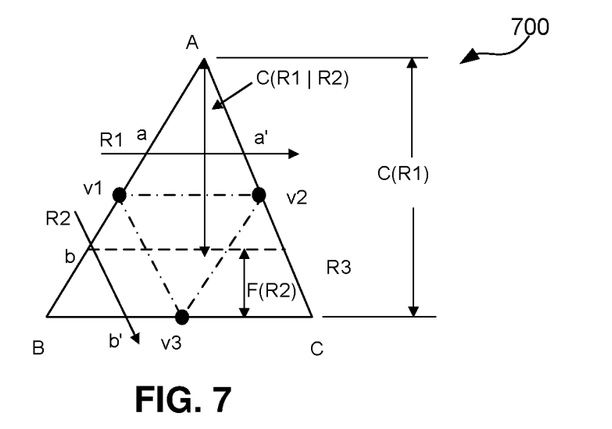
FIG. 7 depicts capacity adjustment considering existing preroutes, in accordance with an embodiment of the present disclosure.

FIG. 7 depicts capacity adjustment based on the existing preroutes in accordance with an embodiment of the present disclosure. Schematic 700 shows preroutes a-a' parallel to BC and b-b' (R2) parallel to AC. R1 and R2 represent routings going in different directions. R1 represents routing crossing edge AB and AC. R2 represents routing crossing edge AB and BC.

Let C (R1|R2) represents the remaining capacity of R1 with the presence of preroute R2, then C (R1|R2)=C (R1)–F(R2), where C (R1) is the total capacity of R1 if R2 is not present and F (R2) is capacity reduced due to presence of R2.

Figure 8:
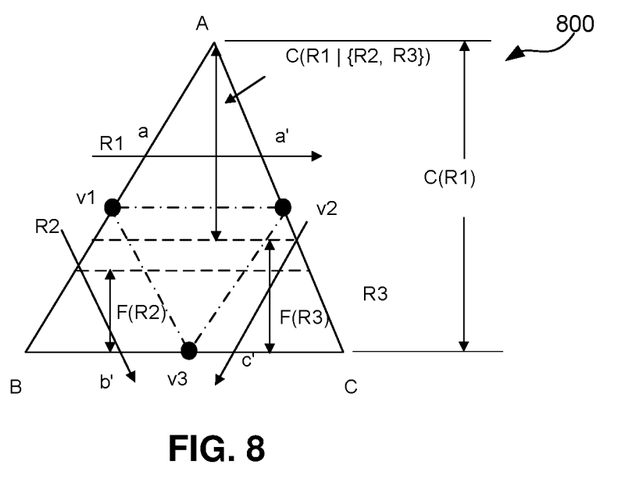
FIG. 8 depicts capacity adjustment considering existing preroutes, in accordance with an embodiment of the present disclosure.

FIG. 8 depicts capacity adjustment considering existing preroutes in accordance with an embodiment of the present disclosure. Schematic 800 shows that preroute a-a' is parallel to BC, b-b' is parallel to AC, and c-c' is parallel to AB. R1 represents routing crossing edge AB and AC. R2 represents routing crossing edge AB and BC. R3 represents routing crossing edge AC and BC. Let C (R1|{R2, R3}) be the remaining capacity of R1 with the presence of preroutes R2 and R3, then C (R1|{R2, R3})=C (R1)–max (F(R2), F(R3)) where C (R1) is the total capacity of R1 if R2/R3 are not present, F (R2) is the capacity reduced due to presence of R2, and F(R3) is the capacity reduced due to presence of R3.

Coarse routing (step 110 of FIG. 1) includes pin escape routing and single-layer routing on the primary routing layer determined at step 106 of FIG. 1. The purpose of pin escape route is to create a short connection from a pin to reach the primary routing layer for the 2-pin net established in step 106 of FIG. 1 (i.e., trial route). The pin escape route described herein considers stacking rules of vias and any angle requirements to reach the designated layer for a specific net while optimizing wiring length.

Figure 9:
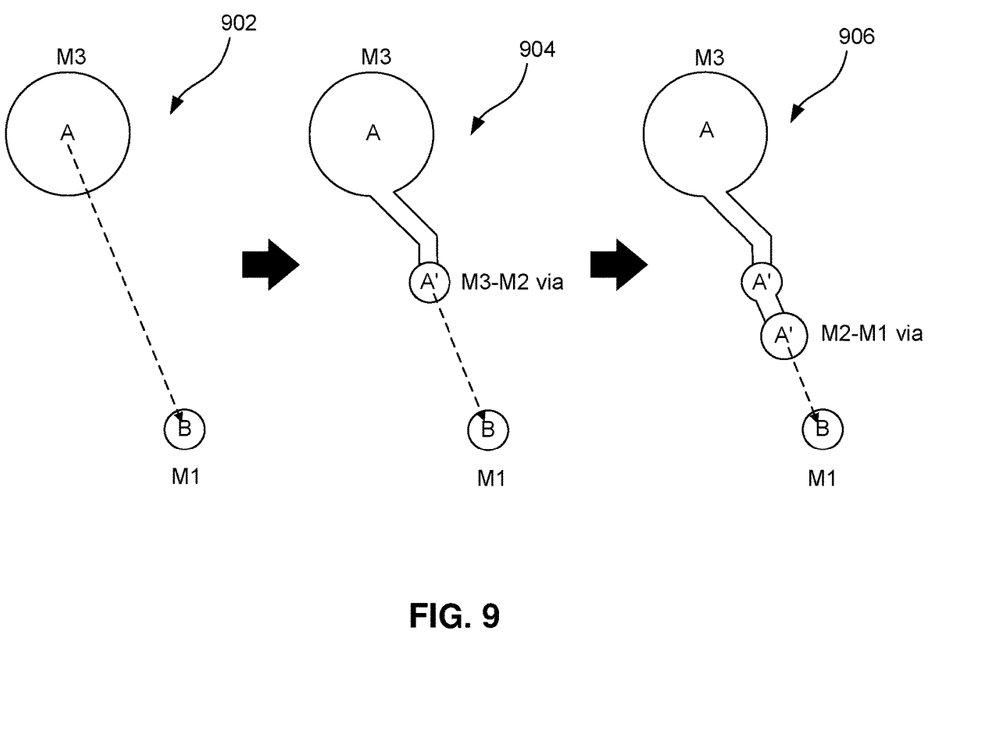
FIG. 9 depicts a pin escape routing example, in accordance with an embodiment of the present disclosure.

FIG. 9 depicts a pin escape routing example, in accordance with an embodiment of the present disclosure. In one example, M3 pin A can be routed towards M1 pin B as shown in 902. In one example, M3-M2 and M2-M1 have non-stacking via rule. Pin escape routing is performed on pin A first to escape it from M3 to M1 before general single-layer routing is performed in step 110 of FIG. 1 (i.e., coarse route).

In one embodiment, M3 may require zig-zag 45-degrees non-stacking vias and M2 may require any-angle non-stacking vias. For escaping from M3 to M2, since the rule may require zig-zag patterns, the pin escape router creates design rule check (DRC) clean 45-degrees zig-zag paths towards pin B and creates a M3-M2 via at A'. Note that if any of the shapes have DRC violations, the pin escape router creates other alternative zig-zag paths which have the shortest wire length. After M3-M2 via is created as shown by 904, the pin escape router continues to create escape paths and vias towards pin B. The escape process is repeated from A' towards pin B with the difference that M2 has any-angle rule rather than zig-zag 45-degrees rule. So, the router creates a straight path towards pin B and a M2-M1 via at A" and finishes the pin escape process as shown in 906.

Figure 10:
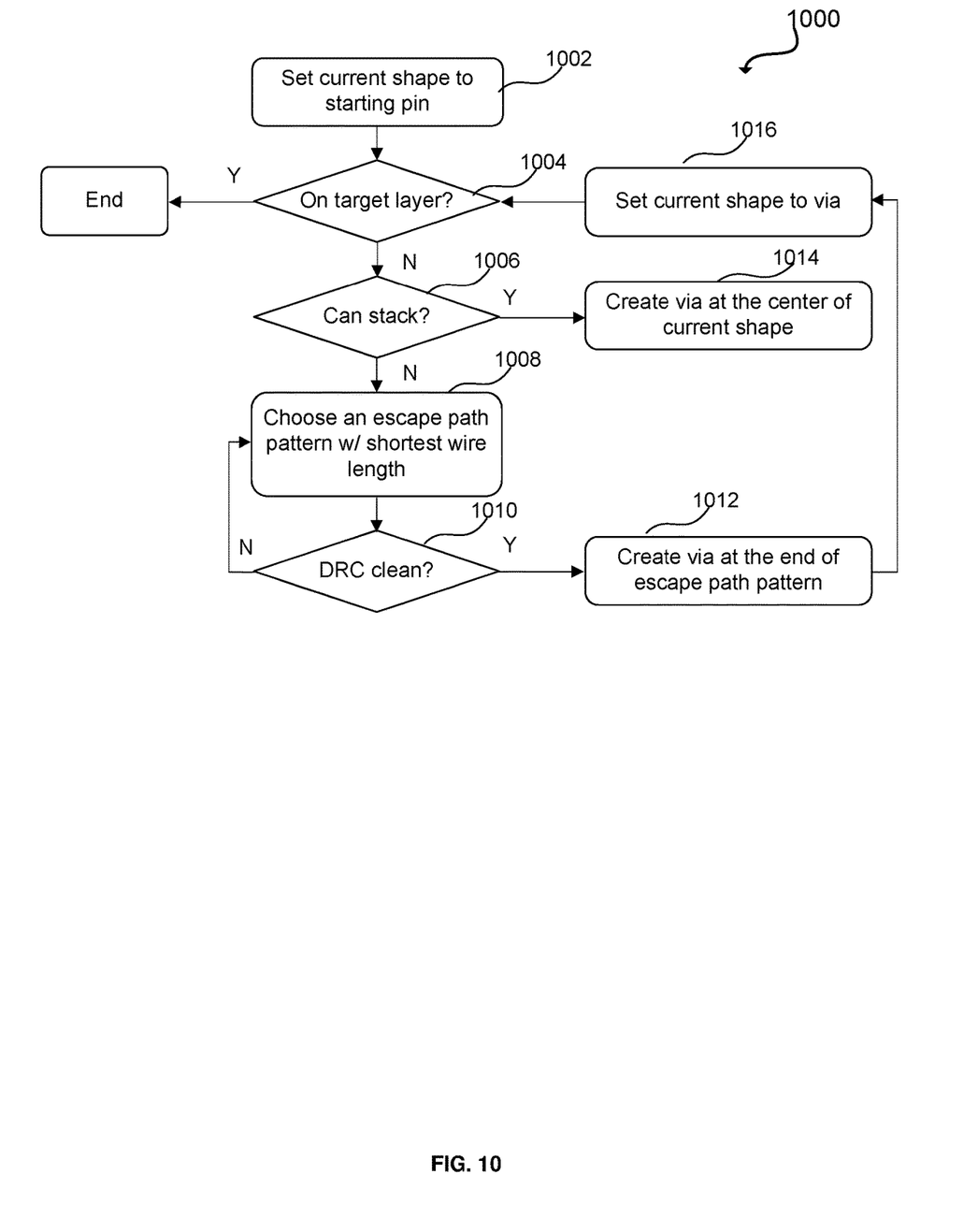
FIG. 10 depicts the pin escape routing flow, in accordance with an embodiment of the present disclosure.

FIG. 10 depicts the pin escape routing flow 1000, in accordance with an embodiment of the present disclosure. In one embodiment, the pin escape routing flow is executed before the coarse routing. The target layer is the designated layer for a 2-pin net determined at step 106 in FIG. 1.

At step 1002, a current shape is set to a starting pin.

At step 1004, a determination is made whether the current shape is on a target layer. In response to determining that the current shape is on the target layer, the process ends. In response to determining that the current shape is not on the target layer, the process proceeds to step 1006.

At step 1006, a determination is made to whether the starting pin can be stacked. In response to determining that the starting pin can be stacked, the process proceeds to step 1014. In response to determining that the pin cannot be stacked, the process proceeds to step 1008.

At step 1008, an escape path with a shortest wire length is selected.

At step 1014, a via is created at the center of the current shape.

At step 1010, a DRC (design rule check) check is performed. In response to determining that the DRC is clean, the process proceeds to step 1012. In response to determining that the DRC is not clean, the process goes back to step 1018.

At step 1012, a via is created at the end of escape path pattern. Then, the process proceeds to step 1016. At step 1016, the current shape is set to the via. Then, the process goes back to step 1004.

The single layer coarse routing is the second step in the coarse routing (i.e., step 110 in FIG. 1). No crossing is allowed between connections from different nets routed on the same layer. The coarse route described herein has built-in crossing-and-length cost to optimize overall routing pattern under length-matching and shielding constraints.

The coarse router is a cost-based router that searches from the source node to the target node through the search graph described in FIG. 4. Each search graph edge has its initial capacity calculated by equations depicted in FIG. 6 when there are no existing preroutes, or as described in FIG. 7 and FIG. 8 when there are existing preroutes. Routing a net through a search graph edge increases the demand on the search graph edge by the routing pitch of the net. The coarse route can route all nets one by one sequentially. The following costs are considered: estimated routed wire length, estimated needed wire length from current point to target, detour, overflow, crossing, and length-matching. The shielding constraint adds extra demand calculated by the shielding setting (e.g., gap, spacing, and the like) that it can be modeled by the overflow cost.

The costs includes crossing and length-matching costs. The crossing between two nets are detected by checking through the recorded routing order on search graph nodes.

Figure 11:
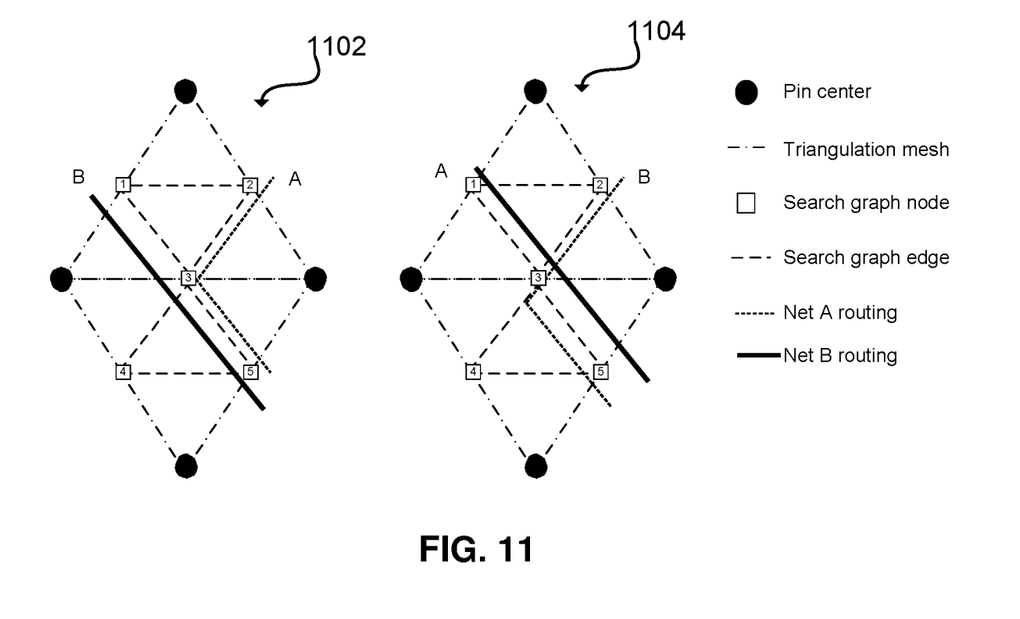
FIG. 11 depicts an example of crossing detection, in accordance with an embodiment of the present disclosure.

FIG. 11 depicts an example of crossing detection, in accordance with an embodiment of the present disclosure. In one example, net A is routed first as shown in graph 1102. When routing net B through search graph node 3 to node 1, the coarse router checks the current and previous triangulation mesh search graph nodes (namely node 1 to 5) to determine if the current routing can cause crossing with the previously routed nets. In graph 1104, since each search graph node records the order of the routed nets, checking search graph nodes 1 to 5 can detect net B crossing with net A. A crossing is modeled as a cost when a crossing is detected.

The length-matching cost is modeled by calculating the difference between the current estimated wire length at a given search graph node and the targeted wire length. In one example, two nets A and B, have length-matching constraint. Net A has pin-to-pin distance of 10 and net B has pin-to-pin distance of 5. Then, net B has the targeted wire length of 10. When determining the cost of a search graph node for net B, the coarse router may first calculate the estimated wire length L from the source node via the current node to the target node for net B. Then, the coarse router may calculate the absolute difference between L and net A pin-to-pin distance as the cost.

An acute angle between two intersecting paths is usually considered a design rule violation in package routing. The acute angle is an angle that is greater than 0° but less than 90°. The acute angle can be generated in detail routing (e.g., at step 112 in FIG. 1). A two-stage acute angle fixing heuristic is described herein that eliminates acute angles from routing while at the same time satisfy minimum segment length or spacing rules.

Figure 12:
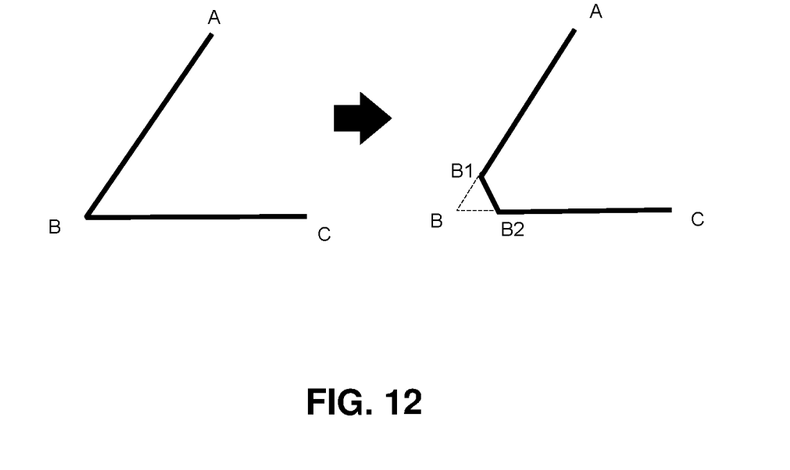
FIG. 12 depicts an example of fixing acute angle in the middle of a connection, in accordance with an embodiment of the present disclosure.

FIG. 12 depicts an example of fixing acute angle in the middle of a connection, in accordance with an embodiment of the present disclosure. An acute angle ∠ABC is generated in the middle of the connection during detail routing. The acute angle may be fixed by adding a third segment B1-B2. The length of B-B1 is equal to the length of B-B2. In addition, the length of the third segment B1-B2 is no less than a minimum process spacing or a minimum process segment length. The newly formed path A-B1-B2-C has no acute angle. Both angle BB1B2 and angle BB2B1 are acute angles. So, angle CB2B1=angle AB1B2=180°−angle BB1B2>90°.

Figure 13:
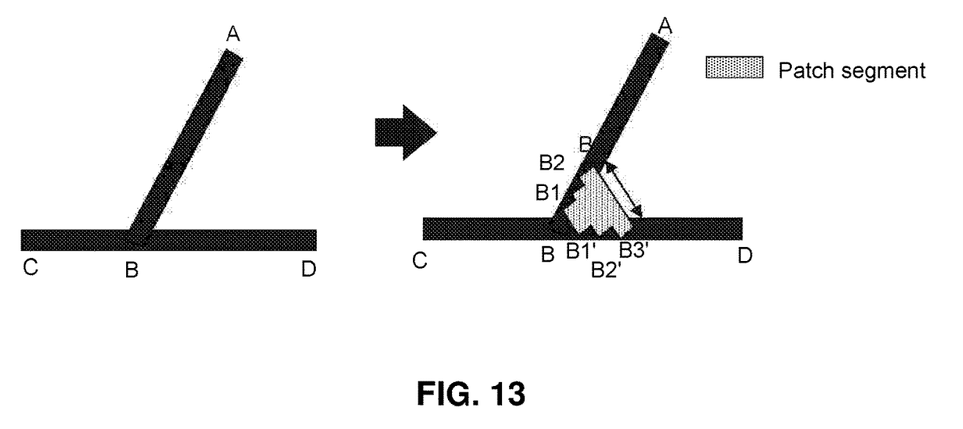
FIG. 13 depicts fixing acute angle occurring at the beginning or end of the connection, in accordance with an embodiment of the present disclosure.

FIG. 13 depicts fixing acute angle occurring at the beginning or the end of the connection, in accordance with an embodiment of the present disclosure. Suppose CD is a preexisting segment and cannot be modified. A new connection AB is being generated. Connection AB intersects CD at point B. In one example, the resulting angle ABD is an acute angle. The acute angle can be fixed by adding a series of abutting patching segments B1B1', B2B2', B3B3' and the like, such that length (BBi)=length (BBi') (i=1, 2, 3 . . . ). The patching process stops when the last segment BiBi' has a length BiBi' no less than the minimum process spacing or the minimum process segment length.

A power/ground router that is power/ground plane-aware is described herein. The power/ground router optimizes power/ground routing patterns for short connections directly to the planes as well as connect disjoint planes of a same net through a heuristic.

Figure 14:
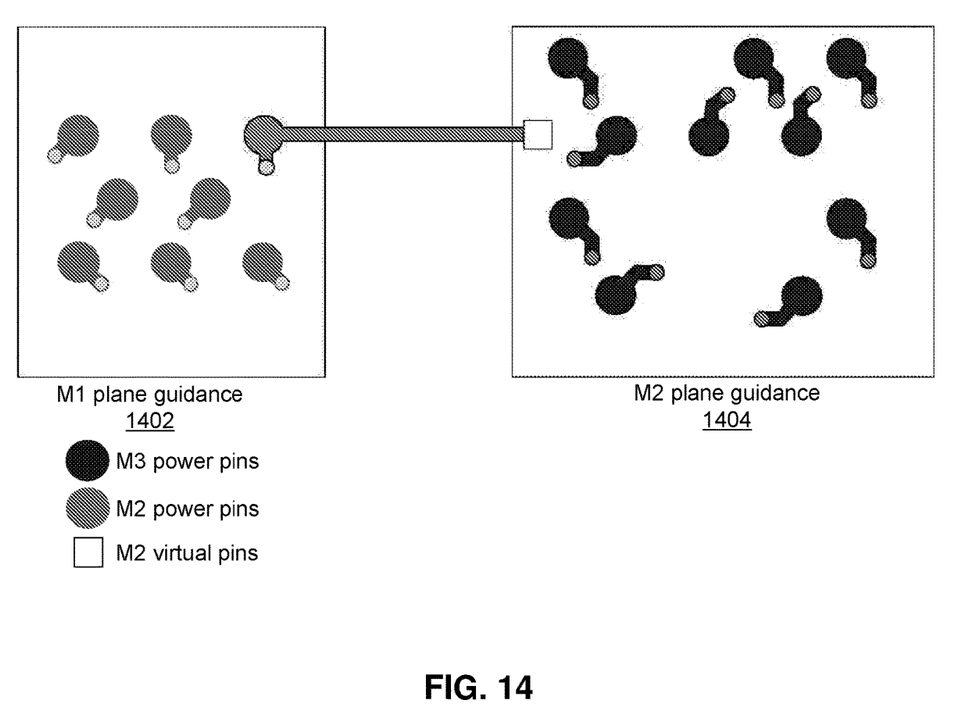
FIG. 14 depicts a power/ground routing example, in accordance with an embodiment of the present disclosure.

FIG. 14 depicts a power/ground routing example, in accordance with an embodiment of the present disclosure. In one example, a design may require two power planes for the power domain a M1 plane guidance 1402 and a M2 plane guidance 1404. M2 power pins are in the M1 plane guidance 1402 and M3 power pins are in the M2 plane guidance 1404.

The power/ground router may first escape the power pins to the nearest plane respectively using the method of the pin escape routing shown and described in FIG. 10. Then, the router may identify the pin to use as a source and may create a virtual pin as a target to connect disjoint planes. The routing from the source to the target uses same routing techniques as described in coarse routing (i.e., step 110 in FIG. 1).

Figure 15:
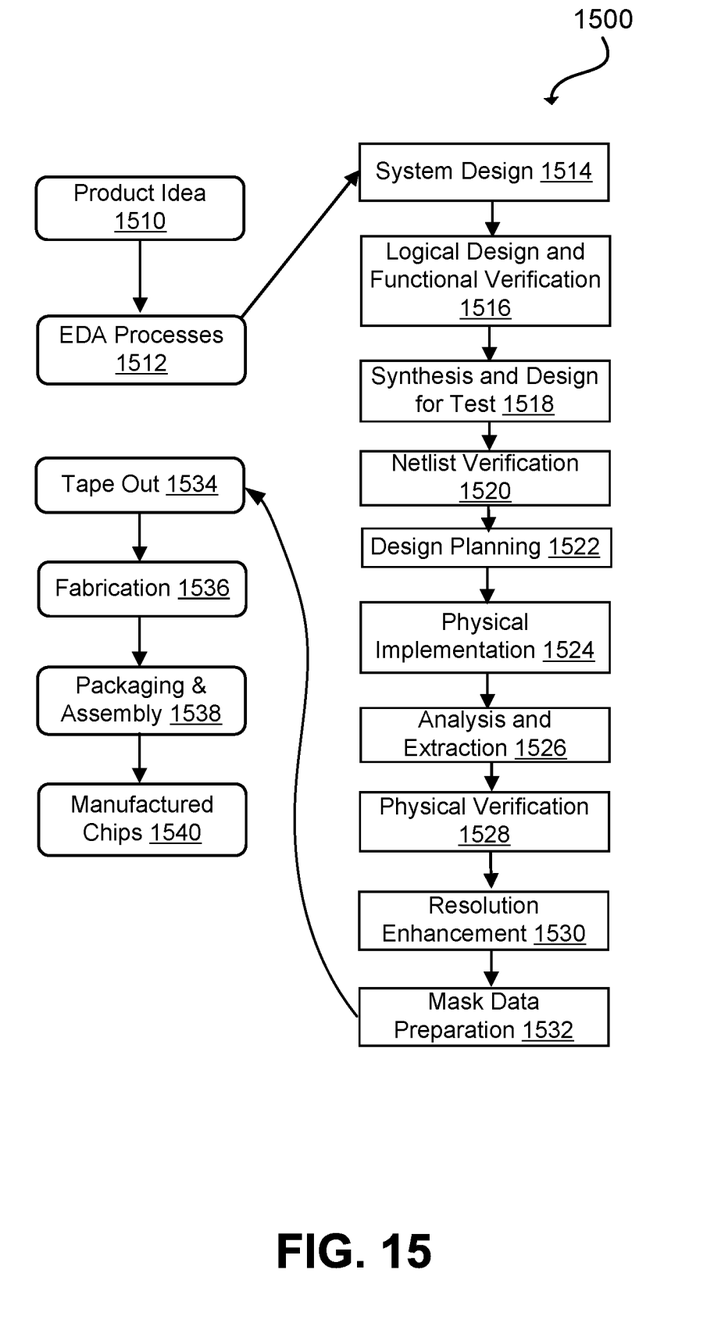
FIG. 15 depicts a flowchart of various processes used during the design and manufacture of an integrated circuit in accordance with some embodiments of the present disclosure.

FIG. 15 illustrates an example set of processes 1500 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1510 with information supplied by a designer, information which is transformed to create an article of manufacture that uses a set of EDA processes 1512. When the design is finalized, the design is taped-out 1534, which is when artwork (e.g., geometric patterns) for the integrated circuit is sent to a fabrication facility to manufacture the mask set, which is then used to manufacture the integrated circuit. After tape-out, a semiconductor die is fabricated 1536 and packaging and assembly processes 1538 are performed to produce the finished integrated circuit 1540.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 15. The processes described by be enabled by EDA products (or tools).

During system design 1514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1520, the netlist is checked for compliance with timing constraints and for correspondence with the HDL code. During design planning 1522, an overall floor plan for the integrated circuit is constructed and analyzed for timing and top-level routing.

During layout or physical implementation 1524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1526, the circuit function is verified at the layout level, which permits refinement of the layout design. During physical verification 1528, the layout design is checked to ensure that manufacturing constraints are correct, such as DRC constraints, electrical constraints, lithographic constraints, and that circuitry function matches the HDL design specification. During resolution enhancement 1530, the geometry of the layout is transformed to improve how the circuit design is manufactured.

During tape-out, data is created to be used (after lithographic enhancements are applied if appropriate) for production of lithography masks. During mask data preparation 1532, the 'tape-out' data is used to produce lithography masks that are used to produce finished integrated circuits.

A storage subsystem of a computer system (such as computer system 1600 of FIG. 16) may be used to store the programs and data structures that are used by some or all of the EDA products described herein, and products used for development of cells for the library and for physical and logical design that use the library.

Figure 16:
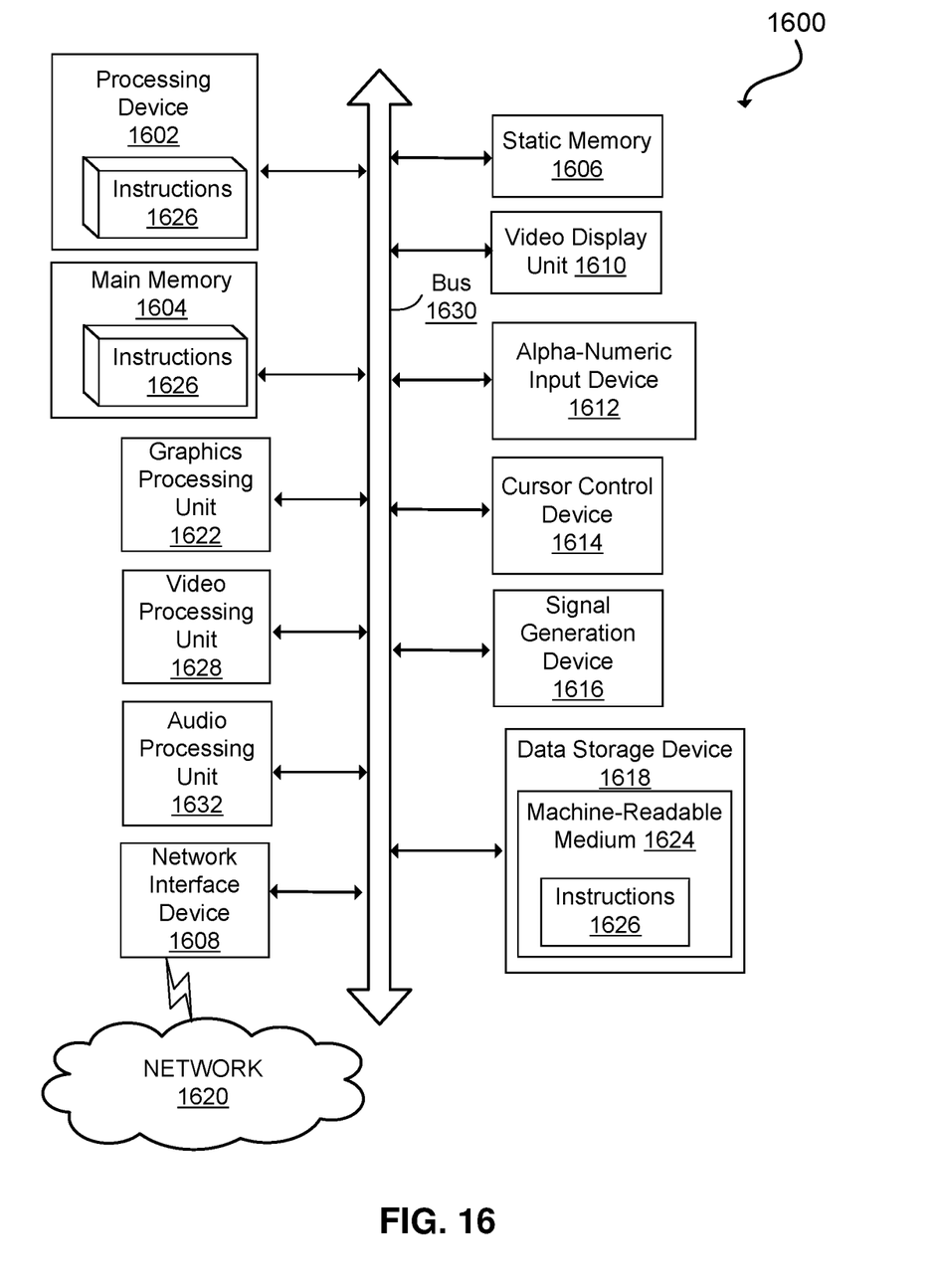
FIG. 16 depicts an abstract diagram of an example computer system in which embodiments of the present disclosure may operate.

FIG. 16 illustrates an example machine of a computer system 1600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1600 includes a processing device 1602, a main memory 1604 (e.g., read-only memory (ROM), flash memory, dynamic random access memory (DRAM) such as synchronous DRAM (SDRAM), a static memory 1606 (e.g., flash memory, static random access memory (SRAM), etc.), and a data storage device 1618, which communicate with each other via a bus 1630.

Processing device 1602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1602 may also be one or more special-purpose processing devices such as an application specific integrated circuit (ASIC), a field programmable gate array (FPGA), a digital signal processor (DSP), network processor, or the like. The processing device 1602 may be configured to execute instructions 1626 for performing the operations and steps described herein.

The computer system 1600 may further include a network interface device 1608 to communicate over the network 1620. The computer system 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), a graphics processing unit 1622, a signal generation device 1616 (e.g., a speaker), graphics processing unit 1622, video processing unit 1628, and audio processing unit 1632.

The data storage device 1618 may include a machine-readable storage medium 1624 (also known as a non-transitory computer-readable medium) on which is stored one or more sets of instructions 1626 or software embodying any one or more of the methodologies or functions described herein. The instructions 1626 may also reside, completely or at least partially, within the main memory 1604 and/or within the processing device 1602 during execution thereof by the computer system 1600, the main memory 1604 and the processing device 1602 also constituting machine-readable storage media.

In some implementations, the instructions 1626 include instructions to implement functionality corresponding to the present disclosure. While the machine-readable storage medium 1624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
performing, by one or more processing devices, triangulation on a set of nets to generate a routing resource graph, wherein objects of the set of nets are represented by a respective center point during triangulation;
generating, by the one or more processing devices, a route between the objects of the set of nets based on at least a total cost, wherein the total cost is determined based on at least the routing resource graph, wherein generating the route comprises determining a pin escape route from a object to a routing layer based on stacking rules of vias and angle requirements;
altering, by the one or more processing devices, the route based on a determination that a constraint rule is unmet; and
outputting, by the one or more processing devices, routing information comprising the route for the set of nets.

2. The method of claim 1, further comprising:
generate a short route between a first object and a second object prior to performing the triangulation, the first object and the second object being adjacent on a layer or the first object and the second object have a same horizontal location on two adjacent layers.

3. The method of claim 1, wherein determining the pin escape route comprises:
associating a current shape with the object;
creating a via at a center of the current shape when the object can be stacked based on the stacking rules of the vias; and
generating an escape path and creating a second via at an end of the escape path when the object cannot be stacked based on the stacking rules of the vias.

4. The method of claim 1, wherein the total cost includes a crossing cost and a length matching cost.

5. The method of claim 4, further comprising:
performing a check on the routing resource graph to determine whether a current routing crosses a routed net; and
modeling a crossing as the crossing cost when the current routing crosses the routed net.

6. The method of claim 4, further comprising:
determining the length matching cost from a difference between an estimated wire length for the routing resource graph and a target wire length.

7. The method of claim 1, wherein generating a route is based on the total cost and a routing capacity.

8. The method of claim 7, wherein the routing capacity is based on an obstruction size and preroutes.

9. The method of claim 1, wherein altering the route further comprises:
determining whether an angle between a first segment and a second segment violates a design rule, the first segment and second segment being contiguous on a route between the objects; and
inserting a third segment between the first segment and the second segment, wherein a length of the third segment satisfies a minimum segment length of the design rule.

10. The method of claim 1, wherein altering the route further comprises:
determining whether an angle between an existing connection and a connection generated by the routing violates a design rule; the angle being at a distal end of the connection; and
adding one or more patching segments when the angle violates the design rule.

11. The method of claim 1, further comprising:
performing power/ground routing by escaping a power pin to a plane; and
connecting disjoint planes by connecting the power pin to a virtual pin.

12. A system, comprising:
a memory storing instructions; and
a processor, coupled with the memory and to execute the instructions, the instructions when executed cause the processor to:
perform triangulation on a set of nets to generate a routing resource graph, wherein objects of the set of nets are represented by a respective center point during triangulation,
generate a route between the objects of the set of nets based on at least a total cost, wherein the total cost is determined based on at least the routing resource graph and wherein the total cost includes a crossing cost and a length matching cost,
alter the route based on a determination that a constraint rule is unmet, and
output routing information comprising the route for the set of nets.

13. The system of claim 12, wherein the processor is further configured to perform operations comprising:
generate a short route between a first object and a second object prior to performing the triangulation, the first object and the second object being adjacent on a layer or the first object and the second object have a same horizontal location on two adjacent layers.

14. The system of claim 12, wherein generating a route further comprises:
determine a pin escape route from a object to a routing layer based on stacking rules of vias and angle requirements.

15. The system of claim 14, wherein determining a pin escape route comprises:
associate a current shape with the object;
create a via at a center of the current shape when the object can be stacked based on the stacking rules of the vias; and
generate an escape path and creating a second via at an end of the escape path when the object cannot be stacked based on the stacking rules of the vias.

16. The system of claim 12, wherein the processor is further configured to perform operations comprising:
perform a check on the routing resource graph to determine whether a current routing crosses a routed net; and
model a crossing as the crossing cost when the current routing crosses the routed net.

17. The system of claim 12, wherein the processor is further configured to perform operations comprising:
determine a difference between an estimated wire length for the routing resource graph and a target wire length.

18. The system of claim 12, wherein the processor is further configured to perform operations comprising:
perform power/ground routing by escaping a power pin to a plane; and
connect disjoint planes by connecting the power pin to a virtual pin.

19. The system of claim 12, wherein altering the route further comprises:
determine whether an angle between a first segment and a second segment violates a design rule, the first segment and second segment being contiguous on a route between the objects; and
insert a third segment between the first segment and the second segment, wherein a length of the third segment satisfies a minimum segment length of the design rule.

20. A non-transitory computer readable medium comprising stored instructions, which when executed by a processor, cause the processor to:
perform triangulation on a set of nets to generate a routing resource graph, wherein objects of the set of nets are represented by a respective center point during triangulation;
generate a route between the objects of the set of nets based on at least a total cost, wherein the total cost is determined based on at least the routing resource graph;
alter the route based on a determination that a constraint rule is unmet;
output routing information comprising the route for the set of nets;
perform power/ground routing by escaping a power pin to a plane; and
connect disjoint planes by connecting the power pin to a virtual pin.

* * * * *